US008543855B2

United States Patent
Moloney

(10) Patent No.: US 8,543,855 B2
(45) Date of Patent: Sep. 24, 2013

(54) ENERGY EFFICIENT MULTIFUNCTION PRINTING SYSTEMS AND METHODS FOR EXITING LOW POWER MODE

(75) Inventor: Christopher Moloney, Hitchin (GB)

(73) Assignee: Xerox Corporation, Norwalk, CT (US)

( * ) Notice: Subject to any disclaimer, the term of this patent is extended or adjusted under 35 U.S.C. 154(b) by 203 days.

(21) Appl. No.: 13/092,357

(22) Filed: Apr. 22, 2011

(65) Prior Publication Data
US 2012/0272081 A1    Oct. 25, 2012

(51) Int. Cl.
*G06F 1/00* (2006.01)
(52) U.S. Cl.
USPC .......................................................... 713/323
(58) Field of Classification Search
USPC ................................................ 713/320–323
See application file for complete search history.

(56) References Cited

U.S. PATENT DOCUMENTS

| 7,631,208 B2 * | 12/2009 | Ishida ............................ 713/320 |
| 2004/0107372 A1 * | 6/2004 | Morisawa ...................... 713/300 |
| 2006/0075150 A1 * | 4/2006 | Hwang et al. .................... 710/14 |
| 2006/0187480 A1 | 8/2006 | Tsuchiya et al. |
| 2007/0047993 A1 | 3/2007 | Brinsley |
| 2008/0109663 A1 | 5/2008 | Snyder et al. |
| 2010/0149573 A1 | 6/2010 | Pat et al. |
| 2011/0010571 A1 | 1/2011 | Dance et al. |
| 2012/0206414 A1 * | 8/2012 | Tada et al. ...................... 345/175 |

* cited by examiner

*Primary Examiner* — Kim Huynh
*Assistant Examiner* — Alyaa T Mazyad
(74) *Attorney, Agent, or Firm* — Fay Sharpe LLP

(57) ABSTRACT

Multifunction document processing systems and operating methods are presented for energy efficient transitions from low power mode to a partially functional mode in which only certain document processing components are initialized and powered in order to support document processing tasks selected by a user.

16 Claims, 3 Drawing Sheets

ENERGY EFFICIENT MULTIFUNCTION PRINTING SYSTEMS AND METHODS FOR EXITING LOW POWER MODE

BACKGROUND AND INCORPORATION BY REFERENCE

The present exemplary embodiments relate to multifunction document processing devices and operational methods therefor. Many multifunction imaging devices, such as printers, scanners, and copiers, operate at different power consumption levels. When the devices are not generating images or have not been used for some specified period of time, they typically operate in a power saving mode, sometimes referred to as "low power", "sleep" or "standby" modes. In the low power mode, the devices draw enough power to support low voltage electronics that are awaiting actuation for operation of the device for printing, scanning, or copying. In response to a user pressing a power button or receipt of a print job, the device controller activates the system components and performs a series of startup processes to prepare the printer for use with full functionality enabled. Once the device has been used, it may remain at the higher power consumption level for some predetermined monitoring period of time to maintain one or more components within an operational temperature range in anticipation of imminent subsequent usage to reduce the number of cycles experienced by the components and to reduce user wait time. If the printer is not used during this timeout period, the low power mode is resumed. There is a continuing need for improved multifunction document processing systems and operating methods for transitions from low power mode to conserve energy while providing timely user access to desired printer functions.

Tsuchiya et al. US 2006/0187480, published Aug. 24, 2006, describes a printer with a supply power control unit that implements a sleep mode and a power halt mode for reduced power consumption, the entirety of which is hereby incorporated by reference. Brinsley US 2007/0047993, published Mar. 1, 2007 and assigned to the Assignee of the present application, discloses a digital printer operative in an inactive mode, such as a sleep mode or a cycle-in mode, as well as an active mode, the entirety of which publication is also incorporated herein by reference. Snyder US 2008/0109663, published May 8, 2008 and assigned to the Assignee of the present application, describe systems and processes for enabling a device to adjust the duration of various power modes based on usage of the device, the entirety of which is hereby incorporated by reference. Pat US 2010/0149573, published Jun. 17, 2010 and assigned to the Assignee of the present application, discloses a printer with a display in the controller for displaying a sequence of images of an animated character having eyes in the process of waking up from sleep corresponding to stages of a power up process as the printer moves from a low power consuming mode to a higher power consuming mode, the entirety of which is hereby incorporated by reference. Dance US 2001/0010571, published Jan. 13, 2011 and assigned to the Assignee of the present application, describe systems and methods for providing a timeout for a printer device for shifting from a higher energy to a lower energy mode, the entirety of which is hereby incorporated by reference.

BRIEF DESCRIPTION

The present disclosure relates to energy efficient multifunction document processing systems and operating methods in which the system transitions from a low power mode to a partial functionality mode with only certain document processing components are initialized and powered in order to support document processing tasks selected by a user while keeping at least one document processing component at low or zero power.

In accordance with one or more aspects of the present disclosure, a method is provided for operating a multifunction document processing system. The method involves operation of the document processing system at a low power mode, as well as detecting a first user input while the system remains in the low power mode. In response to the first user input, a user is prompted for further input while keeping the system and the low power mode, and if no further user input is received within a predetermined time, the document processing system is kept in the low power mode. Otherwise, if a second user input is received within the predetermined time period, one or more power consuming system components are initialized to perform user directed document processing tasks. In this manner, the method allows the system to distinguish between inadvertent user inputs (e.g., power switch activation) in which no document processing tasks are intended by the user, and situations in which a user indeed wants the system to provide services.

In certain embodiments, the user is further prompted for input to select either full or partial functionality while the document processing system is kept in the low power mode. If a second user input is received within the first predetermined time period, and if this input indicates selection of partial functionality, one or more power consuming document processing components necessary to perform a user directed document processing task indicated by the second user input are initialized, while at least one power consuming component is kept at low or zero power. By this operation, the system can avoid powering up and initializing all the system components, and thereby conserve energy and avoid unnecessary wear and tear for those components not needed for the task contemplated by the user.

In certain embodiments, moreover, if a second user input is timely received, a further prompt is presented to the user for selection of a specific document processing task. For instance, the user may be presented with a list of common tasks such as "scan to e-mail", "scan to file", "print release", etc. The method in such embodiments further includes receiving a third user input that indicates a specific document processing task, as well as initializing only the system components necessary to perform the specific task indicated by the third user input, while at least one power consuming document processing component is kept at a low or zero power state. Such embodiments further facilitate the conservation of energy by allowing the system to make a more detailed decision about what system components are not required to accommodate the present user needs, thereby potentially saving more energy and component wear.

In certain embodiments, a full initialization of all document processing opponents is performed in response to the first user input when the system is not in a green operational mode. In some implementations, a determination is made as to whether the system is in the green operational mode according to a green mode schedule, based on the current time and current day. This allows configuration of the system to perform full functionality initialization for specific time and day ranges in a normal operational mode, whereas other scheduled times can be accommodated for power conserving (green) mode in which the system selectively initializes only components need for selected partial functionality. In certain embodiments, moreover, the green mode schedule can be set or modified by a user.

In accordance with further aspects of the present disclosure, a method is provided for operating a multifunction document processing system, in which a user input is detected and a determination is made as to whether the user input indicates full or partial system functionality while the system remains in a low power mode. If the received input advocates user selection of partial system functionality, power consuming document processing components of the system necessary to perform a user directed document processing task indicated by the user input are initialized, while at least one other power consuming document processing component is kept at low or zero power.

Still other aspects of the disclosure provide a multifunction document processing system, which includes two or more power consuming document processing components operative to perform document processing operations, along with a power management component and a user interface. The power management component is configured to selectively operate the system in a low power mode and to control initialization of the document processing components. When the system is in the low power mode, the user interface is operative to detect the first user input, and to prompt the user for further input while the power management component maintains the system in the low power mode. If no further user input is received within a predetermined time, the power management component keeps the document processing system in the low power mode. If, however, a second user input is received within the predetermined time, the power management component initializes at least one document processing component to perform one or more user-directed tasks.

In certain embodiments, the user interface prompts the user for further input to select full or partial functionality while the power management component keeps the system in low power mode. The power management component is operative if a second user input is timely received indicating user selection of partial functionality to initialize one or more power consuming components necessary to perform a user-directed document processing task indicated by the second user input while keeping at least one power consuming document processing component at low or zero power.

In certain embodiments, moreover, if the user interface receives the second input indicating a user selection of partial functionality, the interface further prompts the user to select a specific document processing task and receives a third user input with the user selection. The power management component initializes only power consuming document processing components necessary to perform the specific document processing task indicated by the third user input, while keeping one or more components at low or zero power.

In certain embodiments the power management component operates in a normal mode and a green mode. In the normal mode, the power management component performs a full initiation of all document processing components necessary for performance of any user-directed document processing task in response to the user interface receiving the first user input. In certain implementations, the power management component mode (normal or green) is determined according to a green mode schedule based on the current day and time, and the user interface may allow the user to set or modify the green mode schedule.

Still further aspects of the disclosure relates to a multifunction document processing system having a plurality of power consuming document processing components. The system also includes a user interface and a power management component configured to selectively operate the system in a low power mode and to control initialization and powering of document processing components. The user interface is operative when the system is in the low power mode to detect a first user input and in response, to prompt the user for further input. The power management component keeps the system in the low power mode if no further user input is received within a predetermined time. However, if a second user input is received within the predetermined time, the power management component initializes one or more power consuming document processing components to perform at least one user-directed document processing task.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
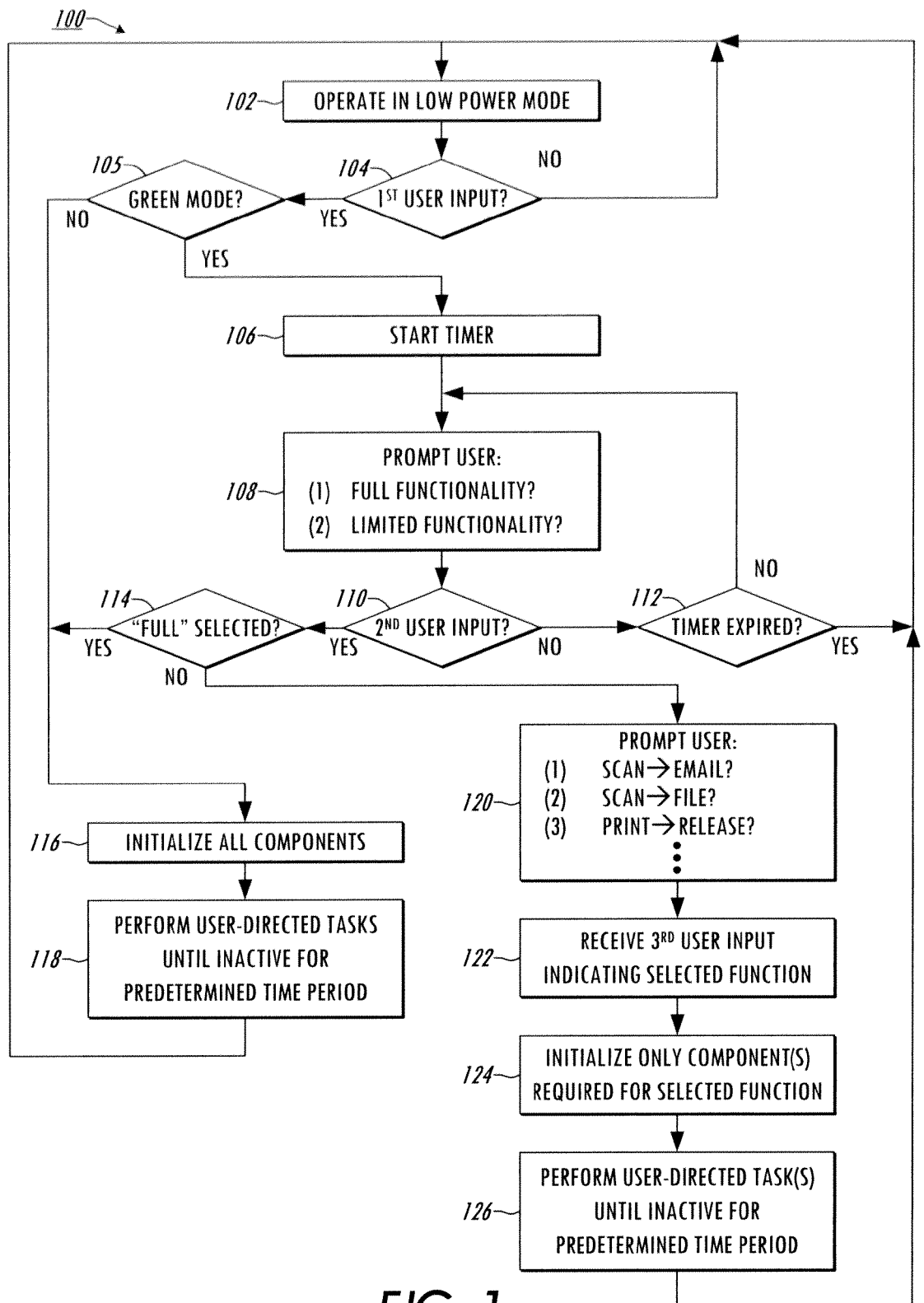
FIG. 1 is a flow diagram illustrating an exemplary method for operating a multifunction document processing system in accordance with one or more aspects of the present disclosure.

Several embodiments or implementations of the different aspects of the present disclosure are hereinafter described in conjunction with the drawings, wherein like reference numerals are used to refer to like elements throughout, and wherein the various features, structures, and graphical renderings are not necessarily drawn to scale. The disclosure relates to multifunction devices which perform a number of different document processing tasks including without limitation scanning, faxing, printing, copying, and/or one or more finishing operations such as collating, stapling, hole punching, etc., in which green mode operation is provided for selective initialization of only those system components needed to perform a given task initiated when the system is in a low power mode. This green mode operation in certain embodiments can be selectively applied at specific times and days according to a schedule, with normal operation otherwise provided in which the device awakes from the low power mode with full functionality initialized and enabled.

With intelligent ready and other usage monitoring algorithms, periods of low activity can be detected or predicted and the machine is put into low power or sleep mode in order to save energy. In conventional devices implementing a sleep mode, when a user pushes a button or touches the user interface (UI), the machine will exit sleep or low power mode, and initiate a series of routines designed to bring the entire device into a fully ready mode to provide the user with full functionality such as print, copy, fax, or scan. As used herein, user means any person who may intentionally or accidentally provide input to a document processing system, including without limitation users who want to perform one or more document processing tasks using the system, as well as service or maintenance personnel who wish to access the system only to check print counts and/or consumable supply levels, update or change IP addresses (e.g., IT personnel), or to otherwise interact with the system (e.g., via the user interface) without performing document processing tasks. However, a detected triggering of the machine to come out of sleep/low power mode may have been accidental or the user may not require the full functionality of the multifunction printer, and any feature which is initialized and not required wastes energy. In the present disclosure, systems are presented in which the user can selectively initiate power up, calibration, startup procedures (collectively referred to herein as initialization) of only those system components which are needed for a specific task, allowing the system to maintain the remainder of the system components in a low power or sleep mode.

In certain implementations, the user interacts with a user interface, which provides intelligent prompting to allow the user to designate or indicate which components are currently needed. In some cases, the user interface will prompt the user to indicate whether full functionality or only partial functionality is currently desired, and if no further user input is received will time out and maintain the system and the low power mode. This technique can advantageously avoid false triggering, and thereby minimize wear and tear on system components and conserve energy. In other examples, the user interface will list pre-designated functions, such as scan to e-mail, scan to file, print, copy, fax, etc., and will receive further user input to select the machine functionality required before triggering the machine to come out of sleep/low power mode. Once the user has confirmed or selected a function on the user interface, only the required system components are then brought out of sleep mode (initialized). In other cases, pressing of specific buttons on the device indicates a desired function and a power management component of the system determines which components are needed based on which button was pushed.

Figure 2:
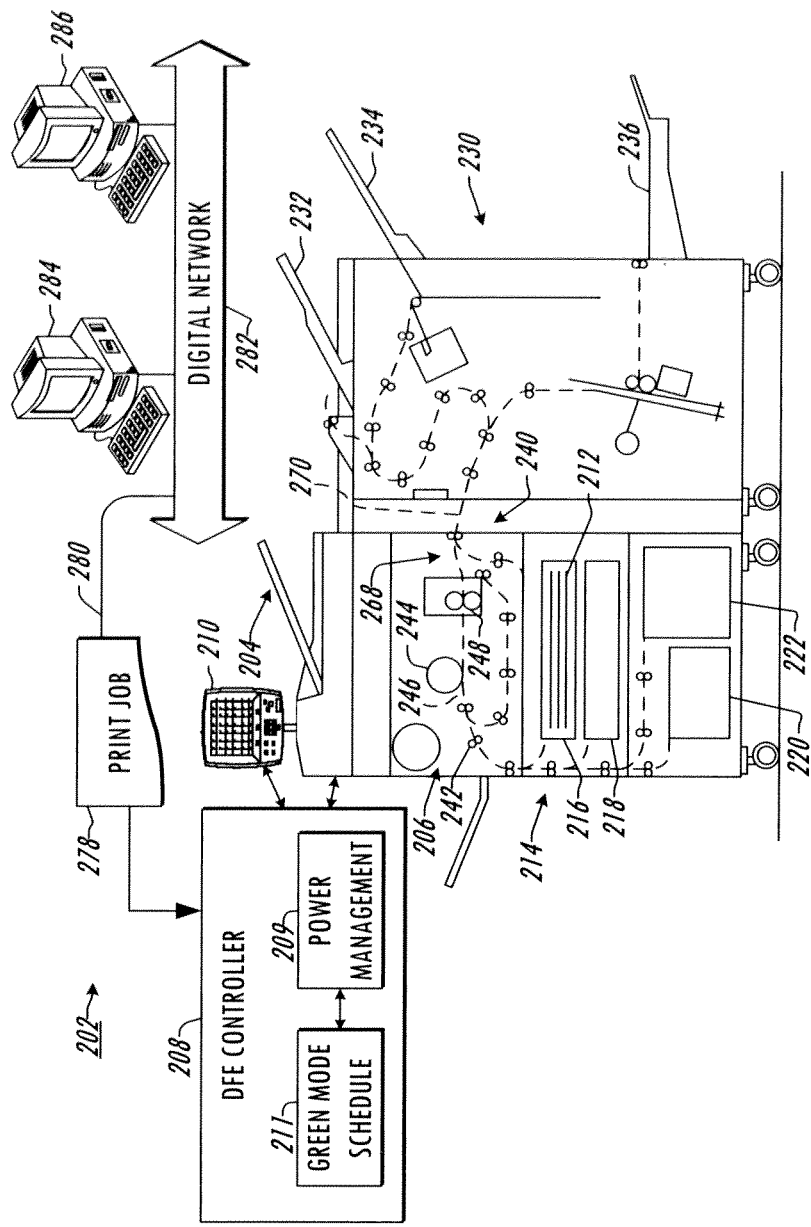
FIG. 2 is a schematic system level diagram illustrating an exemplary multifunction document processing system with a print engine, a scanner, a multi-function finishing station, and a power management system for controlling the powering and initialization of components according to one or more aspects of the present disclosure.
Figure 3:
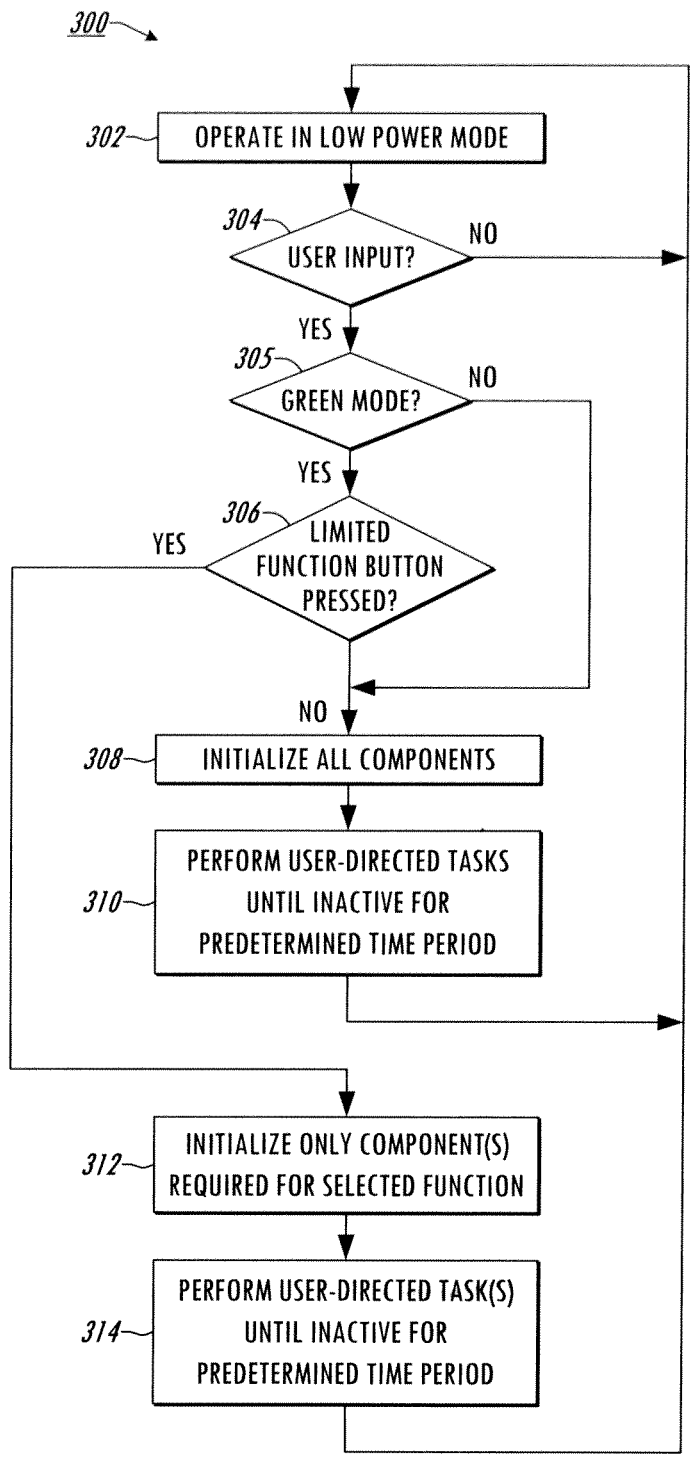
FIG. 3 is a flow diagram illustrating another exemplary method for operating a multifunction document processing system according to the present disclosure.

FIGS. 1 and 3 illustrate exemplary methods or processes 100 and 300, respectively, for operating a multifunction document processing system, and FIG. 2 shows an exemplary system 202 in which these techniques can be employed via a power management component 209 operating according to a green mode schedule 211 stored in the system 202. As seen in the example system of FIG. 2, the system or device 202 includes a variety of components or subsystems, hereinafter collectively referred to as components, such as a scanner 204, one or more print engines 206, a finishing station 230, various paper routing mechanisms, paper trays, or subcomponents of these, such as printheads, fusers, media converters, transfer mechanisms, staplers, collators, hole punchers, etc., which are operable to perform various user-directed document processing tasks, including without limitation scanning, faxing, printing, copying, finishing, etc. Ideally, the system 202 is engineered/design such that as many components, subsystems, etc. as possible are separately initializable/powerable in order to optimize the energy efficiency gains possible through the concepts described herein.

When the system 202 is currently in a low power or sleep mode, activating all of these system components for full functionality can be time-consuming, and powering all these components consumes a great deal of energy. For example, many operations such as scanning to a file or to an e-mail, faxing or making a photocopy require operation of the scanner 204, and the initialization of the scanner 204 typically includes powering and warming up a scanning lamp and/or LEDs or other scanner light source(s), as well as initializing and calibrating the scanner 204. For any tasks involving a print engine 206 (printing a job submitted to the system 202, or making a photocopy) a fuser 248 must be heated and a polygon mirror of a raster output scanner (ROS) must be mechanically rotated by powering an associated motor. In certain systems, the output light exposure source can be an array such as a row, of LEDs (instead of a ROS), in which case such must be powered for printing or copying operations. For initiating solid ink machines (not shown), the printheads, umbilicals, and reservoirs are heated, a drum is oiled and a jet check is performed. In this regard, if the user only wants to scan a document to e-mail or to a file, only the scanner 204, the user interface to 10, an SBC and a network controller are required, while warming the fuser 248 or a print head is a waste of energy. If instead, the user only wants to release a print job that was sent to the system 202, the scanner 204 and the user interface 210 are not required and could instead remain in a low power mode.

The present disclosure provides intelligent wake-up techniques and power management components to determine whether an input action is accidental or unintended, as well as to ascertain whether the user needs full functionality or instead only requires a limited set of the system components to be initialized. In this regard, the provision of physical buttons to select a limited machine function and confirmation of that action on the user interface 210, or functionality to wake the user interface 210 up and offer the list of potentially desired machine functions can advantageously reduce the total energy consumption of the system 202 over its service life or over a given period of time by reducing the number of accidental wake up cycles, and by only powering up subsystems necessary to deliver the user selected functions. Moreover, excluding accidental wake up cycles and selective powering up of a limited set of system components can advantageously increase the life of consumables and components within the system 202, for example by reducing the number of jet check operations and drum cleaning cycles for solid ink machines thereby reducing oil consumption and ink usage. In addition, selective avoidance of initializing certain components can speed up the time from the initial user input to when the system 202 is ready and available to perform the desired task. For instance, if a user only needs to scan a document to a file or to an e-mail, the user does not need to wait for printheads or a fuser 248 to be brought up to temperature, and does not need to wait for initialization of the finishing station components 230.

An exemplary method 100 is illustrated in FIG. 1 for operating a multifunction document processing system, such as the system 202 shown in FIG. 2. While the method 100 and other methods of the disclosure are illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated method 100 and other methods of the disclosure may be implemented in hardware, processor-executed software, logic, etc., or combinations thereof, whether in a single power management component or system or in distributed form in two or more components or systems, and may be employed in association with any form of multifunction printing devices including without limitation desktop printer/scanners, network printers, copiers, scanners, facsimile machines, multifunction printer/copier/facsimile/scanner devices, high-speed printing/publishing systems and digital printing presses, etc., wherein the disclosure is not limited to the specific system 202 illustrated herein.

The process 100 begins at 102 with operation of a multifunction system (system 202 in FIG. 2) in a low power mode. The system awaits a first user input at 104, and if none is received (no at 104), the low power operation continues at 102. Once a first user input is received (yes at 104), such as by a user actuating a power switch, a button or touch screen associated with the user interface 210, a "copy" button, a "scan" button, or other user actuatable control on the system 202, a determination is made at 105 as to whether the system 202 is in a green mode. If not (normal mode, no at 105) the process proceeds to 116 where all components of the system 202 are initialized and the system 202 performs user-directed tasks at 118 until the system is again in an active for a predetermined timeout period, whereupon the process 100 returns to low power operational mode at 102.

If the system 202 is in green mode (yes at 105), a timer is started at 106, and the user interface 210 prompts the user at 108 to select whether full or only limited functionality is desired. A determination is then made at 110 as to whether a second input has been provided by the user, for example, by the user selecting one of the two functionality levels presented at 108. If the system 202 does not receive a second user input (no at 110), a determination is made at 112 as to whether the timer has expired. If not (no at 112), the process returns to continue prompting the user at 108. If the timer has expired without a second input from the user (yes at 112), the process 100 returns to 102 for continued operation in the low power mode. In this manner, the system 202 can avoid component wear and power expenditure associated with unneeded initialization (avoiding accidental wakeup cycles).

If the system 202 to receives a second input from the user (yes at 110), a determination is made at 114 as to whether the user selected full functionality. If so (yes at 114), the system again proceeds to 116 where all the components are initialized and user-directed tasks are performed at 118 until the system is again inactive for a predetermined time.

If the user selected limited or partial functionality (no at 114), the user interface 210 then provides a further prompt to the user at 120 to select a specific document processing task. For example, the user may be presented with one selectable option to indicate scanning to an e-mail, or may be able to select scanning to a file. Other possible options can include, for example, releasing a print job to tell the system 202 to print a previously submitted print job, and the further prompting at 120 can provide any number of different specific selectable tasks. At 122, a third user input is received, which indicates the selected function, and the system 202 initializes only those components (including the possibility of only one component being initialized) required for the selected function at 124. Thereafter at 126, one or more user-directed tasks are performed by the system 202 until it again becomes inactive for the predetermined time period, whereupon the process 100 returns to low power mode at 102.

Variations on the illustrated process 100 above are contemplated, for example, in which the initial prompting at 108 provides one possible selection for full functionality, together with one or more specific limited functions (e.g., scanning to e-mail, scanning to file, print release, etc.). Other possible variations include the prompting at 108 and/or 120 for specific copying and/or printing to single-sided media or two-sided printing/copying, with the system 202 selectively initializing media inverter mechanisms accordingly. Further variations could also include selective prompting for color printing/copying versus black and white printing/copying, with the system 202 selectively initializing multiple print engines for color printing/copying or initializing only a single print engine for black and white printing/copying. In addition, various embodiments may provide for selective initialization and powering of the user interface 210 or not, depending upon whether further user input is required to perform a specific selected document processing task. Other possible considerations that can be accommodated according to the present disclosure include the ability to selectively initialize all or a portion of a multifunction finishing station according to user designated finishing options, or initializing those finishing components associated with a default set of finishing options even without specific prompting therefor. Furthermore, specific prompting and/or dedicated button actuations can be used for selective initialization of only the user interface 210, for example, to accommodate maintenance or service personnel to obtain printer counts and/or to determine consumable supply levels for the system 202 while keeping the remainder of the system components at zero or low power.

FIG. 2 illustrates an exemplary multi-color document processing or printing system 202 provided with a user interface 210 and an intelligent power management system 209 in accordance with one or more exemplary aspects of the disclosure. While illustrated in the context of a single print engine system 202, the various aspects of the disclosure may be implemented in association with document processing systems having multiple print engines, one or more of which may be single-color rendering devices. In the illustrated embodiment, the power management component 209 is implemented in a processor-based system, in one example, as part of the digital front end (DFE) controller 208, having an electronic memory storing a green mode schedule 211. In other embodiments, the power management component 209 can be implemented in any suitable hardware, processor-executed software, logic, etc. within the document processing system 202, or in a hardware-based platform operatively associated with the system 202, for instance in an external computing device (e.g., 284, 286, etc.) operatively coupled with the system 202 via a digital network 282. The power management component 209, moreover, includes suitable hardware connections for providing signals to control application of electrical power to the components (e.g., scanner 204, print engine 206, finishing station 230, etc.) of the document processing system 202, individually, or as groups thereof (e.g., subsystems), and also provides necessary control signals and/or values to the components for initiating and controlling initialization processes for the components, including without limitation calibration steps.

The system 202 of FIG. 2 can be any form of multifunction commercial printing apparatus, copier, printer, facsimile machine, or other system which may include a scanner or other input device 204 that scans an original document text and/or images to create an image comprising pixel values indicative of the colors and/or brightness of areas of the scanned original, or receives images such as in a print job 278, and which has at least one marking engine or print engine 206 by which visual images, graphics, text, etc. are printed on a page or other printable medium, including xerographic, electro photographic, and other types of printing technology such as solid ink printing techniques, wherein such components are not specifically illustrated in FIG. 2 to avoid obscuring the various aspects of the present disclosure.

As shown in FIG. 2, the exemplary document processing system 202 includes a print engine 206, which may be any device or marking apparatus for applying an image from the digital front end (DFE) printer job controller 208 to printable media (print media) such as a physical sheet of paper, plastic, or other suitable physical media substrate for images, whether precut or web fed, where the scanner input device 204, print engine 206, and controller 208 are interconnected by wired and/or wireless links for transfer of electronic data therebetween, including but not limited to telephone lines, computer cables, ISDN lines, etc. The printing system 202, moreover, includes an integral user interface 210 with a display and suitable operator/user controls such as buttons, touch screen, etc. Other forms of user interface 210 may be used, including without limitation voice-activated interfaces, wireless interface devices, etc. The print engine 206 generally includes hardware and processor-executed software elements employed in the creation of desired images by electrophotographic processes wherein suitable print engines 206 may also include ink-jet printers, such as solid ink printers, thermal head printers that are used in conjunction with heat sensitive paper, and other devices capable of printing or marking an image on a printable media.

The image input device (scanner) 204 may include or be operatively coupled with conversion components for converting the image-bearing documents to image signals or pixels or such function may be assumed by the printing engine 206. In the illustrated document processor 202, the printer controller 208 provides the output pixel data from memory to a print engine 206 that is fed with a print media sheets 212 from a feeding source 214 such as a paper feeder which can have one or more print media sources or paper trays 216, 218, 220, 222, each storing sheets of the same or different types of print media 212 on which the marking engine 206 can print.

The exemplary print engine 206 includes an imaging component 244 and an associated fuser 248, which may be of any suitable form or type, and may include further components which are omitted from the figure so as not to obscure the various aspects of the present disclosure. In one example, the print engine 206 may include a photoconductive insulating member or photoreceptor which is charged to a uniform potential via a corotron and exposed to a light image of an original document to be reproduced via an imaging laser under control of a controller of the DFE 208, where the exposure discharges the photoconductive insulating surface of the photoreceptor in exposed or background areas and creates an electrostatic latent image on the photoreceptor corresponding to image areas of the original document. The electrostatic latent image on the photoreceptor is made visible by developing the image with an imaging material such as a developing powder comprising toner particles via a development unit, and the customer image is then transferred to the print media 212 and permanently affixed thereto in the fusing process.

In a multicolor electrophotographic process, successive latent images corresponding to different colors can be formed on the photoreceptor and developed with a respective toner of a complementary color, with each color toner image being successively transferred to the paper sheet 212 in superimposed registration with the prior toner image to create a multi-layered toner image on the printed media 212, where the superimposed images may be fused contemporaneously in a single fusing process. It will be appreciated that the concepts described in the present disclosure are also applicable to other transfer architectures, for example where a multicolor image can be developed on a belt or drum prior to transfer to a final print medium, where any number of intermediate transfer mediums can be used, including zero. The fuser 248 receives the imaged print media from the image-forming component and fixes the toner image transferred to the surface of the print media 212, where the fuser 248 can be of any suitable type, and may include fusers which apply heat or both heat and pressure to an image. Printed media from the printing engine 206 is delivered to a finisher 230 including one or more finishing output destinations 232, 234, 236 such as trays, stackers, pans, etc.

The document processing system 202 is operative to perform these scanning and printing tasks in the execution of print jobs, which can include printing selected text, line graphics, images, machine ink character recognition (MICR) notation, etc., on either or both of the front and back sides or pages of one or more media sheets 212. An original document or image or print job or jobs can be supplied to the printing system 202 in various ways. In one example, the built-in optical scanner 204 may be used to scan an original document such as book pages, a stack of printed pages, or so forth, to create a digital image of the scanned document that is reproduced by printing operations performed by the printing system 202 via the print engine 206, or the digital image of the scanned document can be transferred in electronic form to a designated e-mail address or save to a file accessible via the network 282. Alternatively, the print jobs can be electronically delivered to the system controller 208 via a network or other means, for instance, whereby a network user can print a document from word processing software running on a network computer 284 or 286 with a print job 278 being sent to the DFE 208 of the processing system 202 via a connection 280 to a digital network 282 thereby generating an input print job. In a further nonlimiting example, the system 202 may include a direct port, such as a USB connector, by which a user can submit a print job to the system 202.

A print media transporting system or network or highway 240 of the document processing system 202 links the print media source 214, the print engine 206, and the finisher 230 via a network of flexible automatically feeding and collecting drive members, such as pairs of rollers 242, spherical nips, air jets, or the like, along with various motors for the drive members, belts, guide rods, frames, etc. (not shown), which, in combination with the drive members, serve to convey the print media 212 along selected pathways at selected speeds. Print media 212 is thus delivered from the source 214 to the print engine 206 via a pathway 246 common to the input trays 216, 218, 220, 222, and is printed by the imaging component 244 and fused by the fuser 248, with a pathway 246 from the print engine 206 merging into a pathway 270 which conveys the printed media 212 to the finisher 230, where the pathways 246, 248, 270 of the network 240 may include inverters, reverters, interposers, bypass pathways, and the like as known in the art. In addition, the print engine 206 may be configured for duplex or simplex printing and a single sheet of paper 212 may be marked by two or more print engines 206 or may be marked a plurality of times by the same marking engine 206, for instance, using internal duplex pathways. Furthermore, the finisher 230 may include components to perform various additional tasks to implement user designated finishing options, including without limitation staplers, collators, hole punchers, etc.

In certain embodiments, the system 202 is operative for selective green mode operation of the power management component 209 generally in accordance with the process 100 of FIG. 1. The power management component 209 in certain embodiments is configured to selectively operate the system 202 in a low power mode and to control initialization and powering of various document processing components or groups thereof (e.g., 204, 206, 230, etc.). The user interface 210 receives user inputs, and when the system 202 is in the low power mode, detects a first user input while the power management component 209 keeps the system 202 in the low power mode. If no further user input is received within a first predetermined time following receipt of the first input, the power management component 209 keeps the system 202 in the low power mode, thereby avoiding power consumption in reacting to accidental triggering in situations where the user does not want to perform any document processing tasks with the system 202. If, however, a second user input is received at the interface 210 within the first predetermined time, the power management component 209 initializes at least one power consuming document processing component of the system 202 to perform one or more user-directed document processing tasks.

The user interface 210 in certain embodiments is operative to prompt the user for further input to select full or partial functionality while the power management component 209 keeps the document processing system 202 in the low power mode. If the user interface 210 receives a second user input within the first predetermined time, and if the second input indicates user selection of partial functionality, the power management component 209 initializes one or more components which are necessary to perform a user-directed document processing task indicated by the second user input, while keeping at least one document processing component at low or zero power.

The user interface 210 in certain implementations is further operative if a second user input is received within the first predetermined time to further prompt the user to select a specific document processing task (e.g., as shown at 120 in FIG. 1 above), and to receive a third user input indicating selection of a specific document processing task, such as scan to file, scan to e-mail, single-sided copy, release print, etc. As noted above, receipt of the third user input may be a specific selection provided as part of the initial prompt. The power management component 209 initializes only those document processing components necessary to perform the specific task indicated by the third user input, while keeping the remaining power consuming component or components at low or zero power.

The selective partial wake up functionality may be implemented at all times in the system 202, or in certain embodiments the power management component 209 operates according to a green mode schedule 211, for example, saved an electronic memory in the DFE 208. In these implementations, the power management component 209 is operative at any given time in one of two modes, including a green operational mode as described above, as well as in a normal operational mode. In the normal mode, the power management component 209 is operative in response to receipt by the interface 210 of the first user input (while in low power mode) to perform a full initialization of all the document processing components (e.g. 204, 206, 230) that are necessary to perform any user-directed document processing task or tasks. This normal operational mode may facilitate timely response to user inputs, for example, during peak usage time periods of a workday.

The green mode schedule 211 can be used to designate blocks of time for particular days of the week during which the power management component 209 will operate according to the normal operational mode, and other times during which the power management component 209 will operate in the green mode. For instance, the scheduled 211 may designate normal mode operation for typical business hours of 8 AM through 5 PM on workdays Monday through Friday, and may designate green mode operation for all other times. In certain embodiments, moreover, the user interface 210 allows a user to set or modify the green mode schedule 211.

Referring also to FIG. 3, another exemplary process 300 is illustrated for operating a multifunction document processing system, by which the power management component 209 in FIG. 2 may intelligently control transitions out of a low power mode in order to conserve energy and mitigate wear and tear on the components of the system 202. The system operates in low power mode at 302, and a determination is made at 304 as to whether a user input has been detected (e.g., by the user interface 210). If no user input has been received (no at 304), low power operation is continued at 302. Once a user input has been received (yes at 304), a determination is made at 305 as to whether the system (or the power management component 209 thereof) is currently in the green mode. If not (no at 305 for normal operational mode), the process proceeds to 308 where all the system components are initialized in response to receipt of the user input at 304, and the system performs user-directed tasks until inactive for a predetermined time period, whereupon the process return to operate in low power mode at 302 as described above.

If the system is instead operating in the green mode (yes at 305), a determination is made at 306 as to whether a limited function button was pressed to cause the user input at 304. For example, the input received at 304 may have been caused by the user pressing a "copy" button on the system 202, in which case the power management component 209 can determine that the user desires only limited functionality associated with making a copy. In another example, the user may have pressed a "print release" button on the system 202, whereby the power management component 209 can determine that the user only desires to allow printing of a previously submitted print job. Having ascertained that a limited function button was pressed (yes at 306) the process 300 proceeds to 312 whereat the power management component 209 initializes only those components required for the corresponding selected function. The system 202 then performs user-directed tasks at 314, and returns to operate in the low power mode at 302 once the system has been inactive for a predetermined time period.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method for operating a multifunction document processing system, the method comprising:
operating the document processing system in a low power mode;
detecting a first user input to the system at a first time while the document processing system remains in the low power mode;
in response to the first user input, prompting a user for further input while keeping the document processing system in the low power mode; where prompting the user for further input comprises prompting the user to select full or partial functionality while keeping the document processing system in the low power mode;
if no further user input is received within a first predetermined time from the first time, keeping the document processing system in the low power mode; and
if a second user input is received within the first predetermined time from the first time, initializing at least one power consuming document processing component of the system to perform at least one user-directed document processing task; further comprising:
if a second user input is received within the first predetermined time from the first time indicating user selection of partial functionality, initializing one or more power consuming document processing components necessary to perform a user-directed document processing task indicated by the second user input while keeping at least one power consuming document processing component at low or zero power.

2. The method of claim 1, further comprising:
if a second user input is received within the first predetermined time from the first time indicating user selection of partial functionality, further prompting the user to select a specific document processing task;
receiving a third user input indicating a specific document processing task; and
initializing only power consuming document processing components necessary to perform the specific document processing task indicated by the third user input while keeping at least one power consuming document processing component at low or zero power.

3. The method of claim 2, comprising, in response to the first user input, performing a full initiation of all document processing components necessary to perform any user-directed document processing task if the system is not in a green operational mode.

4. The method of claim 3, comprising determining if the system is not in the green operational mode according to a green mode schedule based on a current time and a current day.

5. The method of claim 4, comprising allowing the user to set or modify the green mode schedule.

6. The method of claim 1, comprising, in response to the first user input, performing a full initiation of all document processing components necessary to perform any user-directed document processing task if the system is not in a green operational mode.

7. The method of claim 6, comprising determining if the system is not in the green operational mode according to a green mode schedule based on a current time and a current day.

8. The method of claim 7, comprising allowing the user to set or modify the green mode schedule.

9. A multifunction document processing system, comprising:
a plurality of power consuming document processing components operative to perform document processing operations on documents;
a power management component configured to selectively operate the document processing system in a low power mode and to control initialization and powering of document processing components of the system;
a user interface operative to receive user inputs, the user interface operative when the document processing system is in the low power mode;
to detect a first user input by detecting actuation by a user of a button or touch screen display of the user interface at a first time, and
to prompt the user for further input in response to the first user input by prompting the user to select full or partial functionality by displaying a prompt screen on a display of the user interface prompting the user to select full or partial functionality while the power management component keeps the document processing system in the low power mode, and
to receive a second user input by the user actuating a button or touch screen display of the user interface indicating user selection of partial functionality within the first predetermined time from the first time;
where the power management component is operative:
to keep the document processing system in the low power mode if no further user input is received within a first predetermined time from the first time, and
in response to the user interface receiving the second user input within the first predetermined time from the first time indicating user selection of partial functionality, to initialize one or more power consuming document processing components necessary to perform a user-directed document processing task indicated by the second user input while keeping at least one power consuming document processing component at low or zero power.

10. The document processing system of claim 9:
where the user interface is operative if a second user input is received within the first predetermined time from the first time indicating user selection of partial functionality, to further prompt the user to select a specific document processing task, and to receive a third user input indicating a specific document processing task; and
where the power management component is operative to initialize only power consuming document processing components necessary to perform the specific document processing task indicated by the third user input while keeping at least one power consuming document processing component at low or zero power.

11. The document processing system of claim 9, where the power management component is operative in a normal operational mode and a green operational mode, and where the power management component is operative in the normal operational mode in response to the user interface receiving the first user input to perform a full initiation of all document processing components necessary to perform any user-directed document processing task.

12. The document processing system of claim 11, where the power management component operates in one of the normal operational mode and the green operational mode according to a green mode schedule based on a current time and a current day.

13. The document processing system of claim 12, where the user interface is operative to allow the user to set or modify the green mode schedule.

14. The method of claim 1, wherein detecting the first user input comprises detecting actuation by a user of a button or touch screen display of a user interface.

15. The method of claim 14, wherein prompting the user to select full or partial functionality comprises displaying a prompt screen on a display of the user interface to prompt the user to select full or partial functionality.

16. The method of claim 15, comprising receiving the second user input by the user actuating a button or touch screen display of the user interface indicating user selection of partial functionality within the first predetermined time from the first time.

* * * * *